May 14, 1929.   E. W. SEEGER   1,712,778
METHOD OF AND MEANS FOR STARTING SYNCHRONOUS MOTORS
Filed Feb. 7, 1927
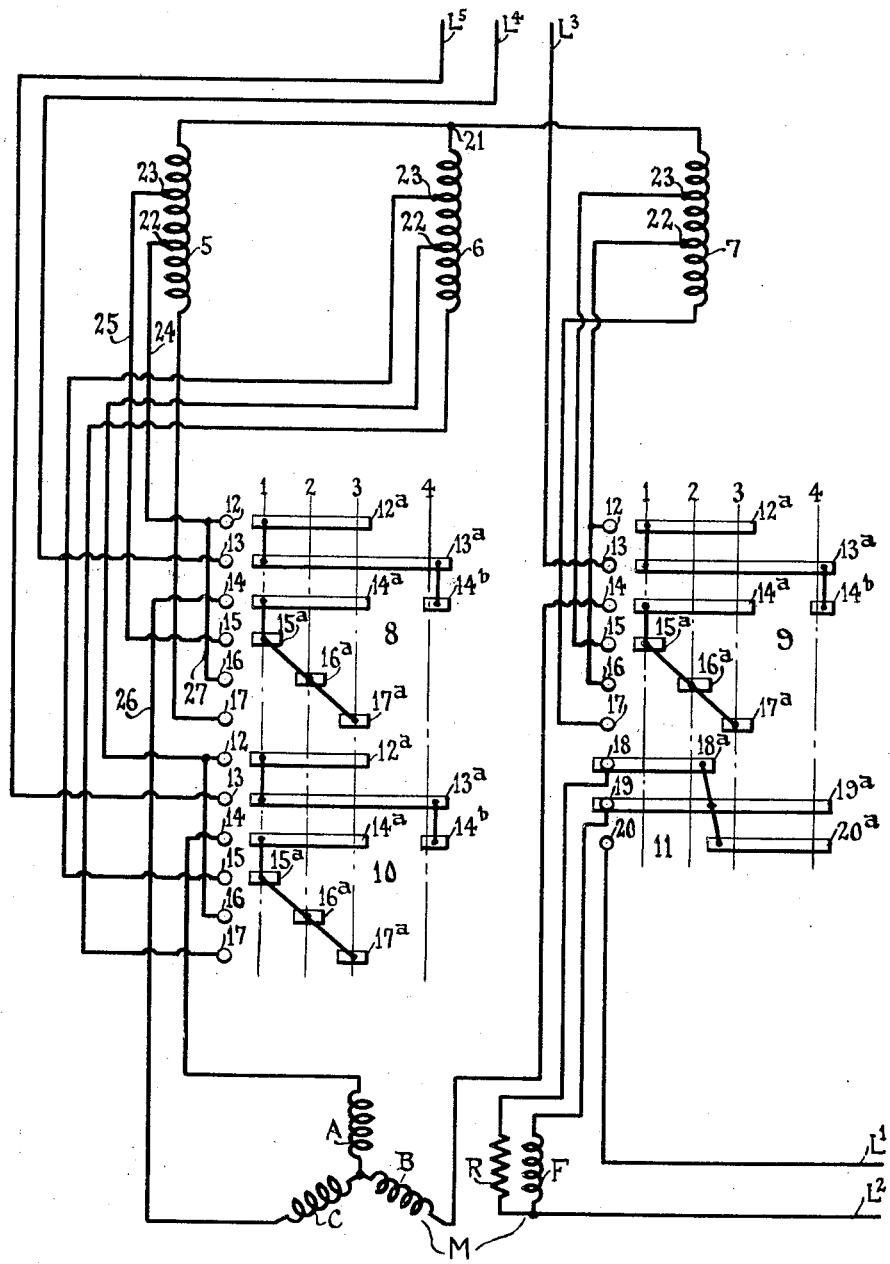
INVENTOR.
Edwin W. Seeger
BY
ATTORNEY.

Patented May 14, 1929.

1,712,778

UNITED STATES PATENT OFFICE.

EDWIN W. SEEGER, OF SOUTH MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE.

METHOD OF AND MEANS FOR STARTING SYNCHRONOUS MOTORS.

Application filed February 7, 1927. Serial No. 166,442.

This invention relates to improvements in methods of and means for starting synchronous motors.

One of the principal difficulties encountered in using synchronous motors is that motors of this type are generally incapable of pulling the load into step, especially in cases where the load is somewhat in excess of that for which the motor was designed. I have found that by using a special transformer much better results may be obtained with the aforementioned type of motor.

In accordance with my invention the motor would be initially connected in the usual manner through reduced voltage taps on the transformer and then thrown to full voltage. The transformer would also be provided with over-voltage taps so that a voltage higher than the normal voltage could be applied to the motor. The motor would then be connected to this higher voltage for a short period and pulled into step, after which it would be reconnected to the normal voltage supply. The field would preferably be applied while the motor is connected through the over-voltage taps.

This arrangement has certain advantages. Thus the synchronizing torque will vary with the voltage, so that if the motor is subjected to a voltage substantially above normal through said over-voltage taps the torque of the motor will be materially increased. Moreover, due to the increased torque, the slip of the motor when running as an induction machine is less, and it is therefore easier to pull it into step.

An object of the invention is to provide a method for accomplishment of the aforementioned desirable results, without materially increasing the maximum current drawn by the motor during the starting period.

Another object is to provide means for carrying out such method.

Other objects and advantages of the invention will hereinafter appear.

The accompanying drawing illustrates one embodiment of my invention which will now be described, it being understood that the invention is susceptible of embodiment in various other forms without departing from the scope of the appended claims.

In the drawing the reference character M designates a synchronous motor having the usual windings A, B and C and a field winding F, the latter to be separately excited through connection thereof to direct current lines $L^1$, $L^2$ in the manner hereinafter described, and having a suitable discharge resistance R to be connected in a closed loop therewith when said winding is disconnected from the supply lines.

As shown the starter for motor M comprises an auto-transformer having windings 5, 6 and 7, and a control drum having groups of segments 8, 9 and 10 adapted to cooperate with their respective contacts to commutate the motor circuit connections. Said control drum also includes a group of segments 11 adapted to cooperate with their respective contacts to control the circuit of field F. More specifically each of the groups 8, 9 and 10 comprises segments $12^a$ to $17^a$ and $14^b$ adapted to cooperate with the respective contacts 12 to 17. Similarly, the group 11 comprises electrically connected segments $18^a$, $19^a$ and $20^a$ adapted to cooperate with contacts 18, 19 and 20. The segments $12^a$, $13^a$ and $14^b$ of each group 8, 9 and 10 are electrically connected, whereas the segments $14^a$ to $17^a$ of said groups are likewise electrically connected.

The windings 5, 6 and 7 of the auto-transformer are connected at a common point 21 in the usual manner, whereas each winding is connected at its other end to one of the contacts 17 of the control drum. Each of said windings is provided with a tap 22 connected with the respective contacts 12, and said contacts 12 are likewise electrically connected with contacts 16. Said windings are also provided with taps 23 electrically connected with contacts 15. Contacts 14 are connected with the respective windings A, B and C of the motor; whereas contacts 13 are respectively connected with supply lines $L^3$, $L^4$ and $L^5$. It will be noted that the drum controller has a neutral position and four operative positions for effecting the sequence of operations now to be described.

Thus upon movement of the control drum to the first operative position windings A, B and C are connected with lines $L^3$, $L^4$ and $L^5$ through reduced voltage taps on the auto-transformer; the energizing circuit for motor winding C extending from line $L^4$ to contact 13 and segment $13^a$, thence to segment $12^a$ and contact 12, conductor 24 to tap 22, thence through a portion of the winding 5 to tap 23, by conductor 25 to contact 15 and segment 15ª, thence to segment 14ª and contact 14, and by conductor 26 to winding C. The energizing circuits for windings B and A of the motor likewise extend from lines L³ and L⁵ to the drum controller and thence through the voltage taps 22 and 23 on the transformer windings 7 and 6 respectively; said energizing circuits being in all respects exactly like that of winding C as just traced. The windings A, B and C of motor M are thus initially supplied with energizing current under conditions of reduced voltage, in accordance with the usual practice.

Thereafter the drum controller may be moved to its second operative position, thus bringing segment 16ª of each of the groups 8, 9 and 10 into engagement with its cooperating contact 16. In this manner the motor windings A, B and C are subject to full line voltage,—it being only necessary to trace the energizing circuit of winding C inasmuch as the energizing circuits of windings A and B are identical therewith. Said first-mentioned circuit extends from line L⁴ to contact 13 and segment 13ª, thence to segment 12ª and contact 12, by conductor 27 to contact 16 and segment 16ª, thence to segment 14ª and contact 14 and by conductor 26 to winding C.

In many instances a synchronous motor when thus subjected to full line voltage is nevertheless incapable of pulling the load into step, and I have therefore provided means for temporarily subjecting the windings of the motor to excess voltage conditions. Accordingly upon movement of the control drum to its third operative position, excess voltage is applied to the motor windings A, B and C. The energizing circuit for winding C may be traced from line L⁴ to contact 13 and segment 13ª, thence to segment 12ª and contact 12, by conductor 24 to tap 22 on the winding 5 through the lower portion of said winding to contact 17 and segment 17ª, thence to segment 14ª and contact 14, and by conductor 26 to winding C. The energizing circuits of windings A and B are identical with that just traced in connection with winding C, as will be obvious.

The value of excess voltage thus applied to the motor windings A, B and C is preferably such as to substantially increase the torque of the motor, whereby the load is readily pulled into step. Moreover, I preferably provide for completion of the energizing circuit of winding F during subjection of windings A, B and C to excess voltage conditions. Accordingly upon movement of the control drum into said third operative position, an energizing circuit is completed, which may be traced from line L¹ to contact 20 and segment 20ª, thence to segment 19ª and contact 19 and through said field winding F to line L².

The last-mentioned circuit of field F is maintained upon movement of the control drum to its fourth operative position, which results in reconnection of windings A, B and C directly to lines L³, L⁴ and L⁵ for running. The energizing circuit for winding C under these conditions extends from line L⁴ to contact 13 and segment 13ª, thence to segment 14ᵇ and contact 14, and by conductor 26 to said winding C. The energizing circuits for windings A and B extend in like manner from lines L⁵ and L³, respectively.

Upon interruption of the motor circuit connections by the return of the control drum to off or neutral position, field winding F is connected in a closed loop in series with field discharge resistance R, as shown. Said circuit may be traced from the upper terminal of said winding to contact 19 and segment 19ª, thence to segment 18ª and contact 18 through said resistance R, and thence to the other terminal of said winding.

While I have illustrated a drum controller for effecting commutation of the motor circuit connections in the manner aforedescribed, it is to be understood that any other suitable manually or automatically operable means may be provided for effecting the desired sequence of operation.

Also while I have disclosed the use of an auto-transformer, it is obvious that a transformer with separate primary and secondary windings may be employed, whereby the voltage impressed upon the motor may be varied by changing the connections to different taps on either the primary or secondary windings in a manner well known in the art.

What I claim as new and desire to secure by Letters Patent is:

1. In a method of starting synchronous motors, the step which comprises temporarily subjecting the motor armature windings to excess voltage conditions during the accelerating period whereby the slip of the motor is reduced to facilitate synchronizing of the latter.

2. The method of starting a synchronous motor, which comprises temporarily subjecting the motor windings to excess voltage conditions during the accelerating period to bring the motor into step, and completing the energizing circuit for the motor field while said windings are so connected.

3. The method of starting a synchronous motor, which comprises initially connecting the motor windings to a reduced voltage, then connecting said windings to full voltage, then connecting the windings to an excess voltage to increase the torque of the motor whereby the latter is brought into step, and thereafter reconnecting said windings to full voltage.

4. The method of starting synchronous motors when subjected to abnormal load conditions, which comprises connecting the motor windings to the source of supply through excess voltage taps on a transformer to facilitate synchronizing of the motor, and thereafter subjecting the motor windings to normal voltage conditions for running.

5. The method of starting synchronous motors when subjected to abnormal load conditions, which comprises subjecting the motor windings sequentially to reduced and normal voltage conditions, thereafter subjecting said windings to excess voltage conditions to bring the motor into step while simultaneously completing an energizing circuit for the separately excited motor field, and thereafter again subjecting said motor windings to normal voltage conditions for running.

6. In a synchronous motor starter, in combination, means for connecting the motor windings to the source of supply to subject the same to normal voltage conditions, and means for temporarily subjecting said windings to excess voltage conditions to facilitate synchronizing of the motor.

7. In a synchronous motor starter, in combination, means for connecting the motor windings directly to the source of supply to subject the same to normal voltage conditions, means for temporarily subjecting said windings to excess voltage conditions to bring the motor into step, and means for completing the energizing circuit of the motor field winding during continuance of said excess voltage conditions.

8. In a synchronous motor starter, in combination, an auto-transformer, means for initially connecting the motor windings to the line through reduced voltage taps on said transformer, means for thereafter connecting said windings directly to the line to subject the same to normal voltage conditions, and means for thereafter connecting said windings to the line through excess voltage taps on said transformer to temporarily increase the torque of said motor whereby the latter is brought into step.

9. In a starter for synchronous motors, in combination, an auto-transformer, means for initially connecting the motor windings to the line through reduced voltage taps on said transformer, means for thereafter connecting said windings directly to the line to subject the same to normal voltage conditions, means for thereafter connecting said windings to the line through excess voltage taps on said transformer to temporarily increase the torque of said motor whereby the latter is brought into step, and means for thereafter reconnecting said windings directly to the line for running.

10. In a starter for synchronous motors, in combination, an auto-transformer, means for initially connecting the motor windings to the line through reduced voltage taps on said transformer, means for thereafter connecting said windings directly to the line to subject the same to normal voltage conditions, means for thereafter connecting said windings to the line through excess voltage taps on said transformer to thereby temporarily increase the torque of said motor, a separately excited motor field circuit, means for completing said circuit during said excess voltage conditions, and means for thereafter reconnecting said windings directly to the line for running.

11. In a starter for synchronous motors, in combination, an auto-transformer, means for initially connecting the motor windings to the line through reduced voltage taps on said transformer, means for thereafter connecting said windings directly to the line to subject the same to normal voltage conditions, means for thereafter connecting said windings to the line through excess voltage taps on said transformer to thereby temporarily increase the torque of said motor, a separately excited field circuit for the motor, means for completing said circuit during said excess voltage conditions, means for thereafter reconnecting said windings directly to the line for running, and means for insuring operation of said starter in the sequence aforementioned.

In witness whereof, I have hereunto subscribed my name.

EDWIN W. SEEGER.